May 10, 1927.
B. ROSS
1,628,614
AUTOMATIC BELT GUIDE
Filed Nov. 17, 1924
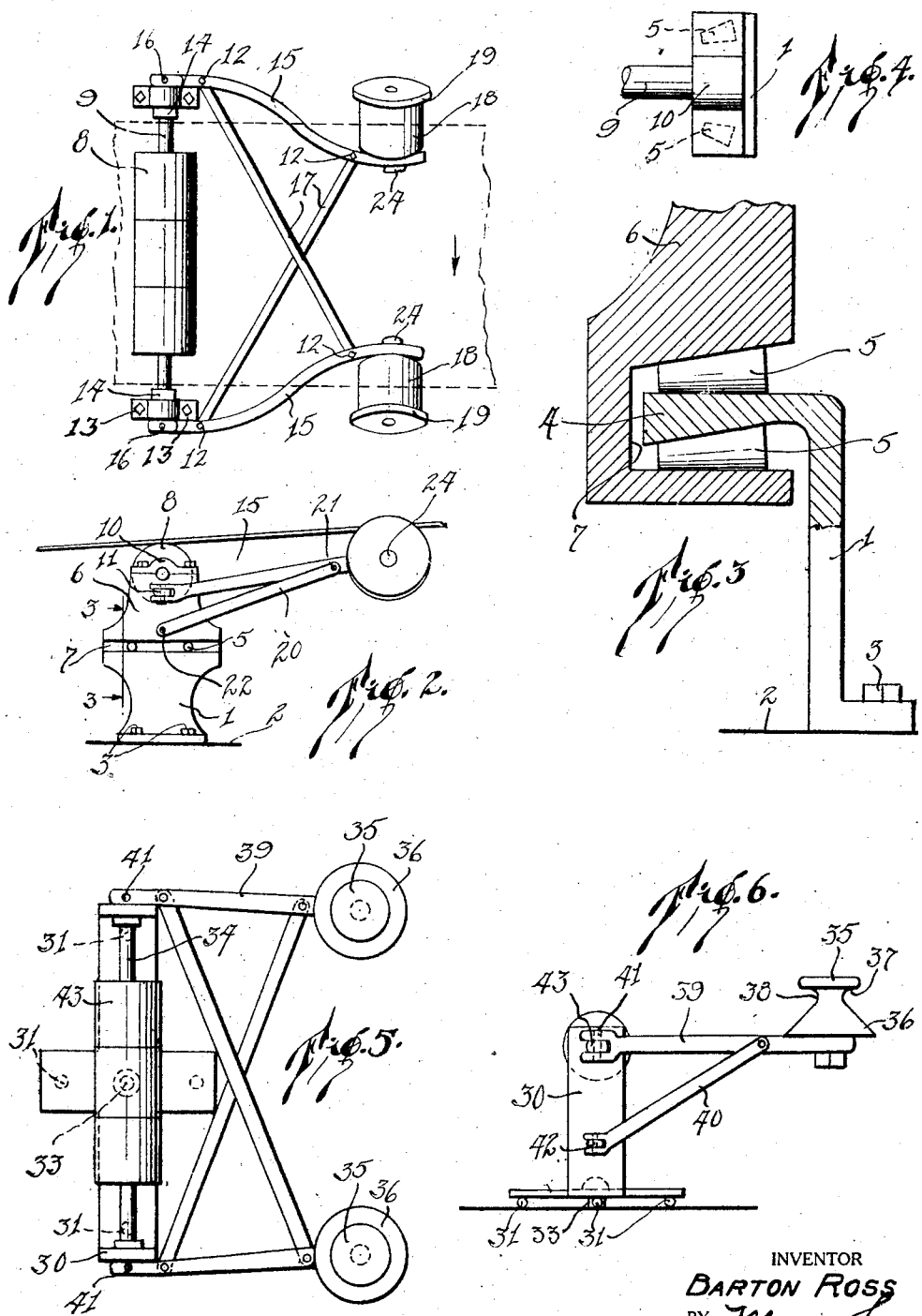
INVENTOR
BARTON ROSS
BY
ATTORNEYS

Patented May 10, 1927.

1,628,614

UNITED STATES PATENT OFFICE.

BARTON ROSS, OF CHICAGO, ILLINOIS.

AUTOMATIC BELT GUIDE.

Application filed November 17, 1924. Serial No. 750,424.

My invention relates to improvements in automatic belt guides, and it consists in the combinations, constructions, and arrangements herein described and claimed.

An object of my invention is to provide an automatic belt guide which has novel means for keeping the belt centered with respect to the central line of the conveyor, this means being adapted, when the belt moves sidewise from a central line of the conveyor, to return the belt to the central line.

A further object of my invention is to provide a device of the type described in which the belt supporting pulley is swung by a belt centering means so as to cause the pulley to center the belt, and in which the means also aids in returning the belt to a central position, this means also being adjustable to function with equal efficiency, no matter in which direction the conveyor belt may be running.

A further object of my invention is to provide a device of the type described in which the pressure of the belt against the auxiliary guiding roller when the belt shifts laterally, will cause the pulley supporting device to rotate upon a pivotal center, thus changing the angle of the auxiliary rollers with respect to the central line of the conveyor, and because of such change of angle, guide the belt back to its normal position whereby the auxiliary rollers will aid in returning the belt back into a central position.

A further object of my invention is to provide a device of the type described which is simple in construction and in which the device itself provides a supporting means for the belt and pulley.

Other objects and advantages will appear in the following specification, and the novel features of the invention will be particularly pointed out in the appended claims.

My invention is illustrated in the accompanying drawings forming part of this application, in which Figure 1 is a plan view of the device, Figure 2 is a side elevation of the device, Figure 3 is an enlarged detail section along the line 3—3 of Figure 2, Figure 4 is a plan view of a portion of the device, Figure 5 is a plan view of a modified form of the device and Figure 6 is a side elevation of Figure 5.

In carrying out my invention I provide a supporting frame which consists of two leg members 1 that are secured to a supporting surface 2 by means of bolts 3. The legs 1 have inwardly extending flanges 4 which are wedge-shaped in cross section, (see Figure 3). The widest portion of the wedge is disposed adjacent to the inner sides of the flanges 4. The flanges 4 slidably carry a pulley supporting device. Figures 3 and 4 clearly show how the pulley supporting device is mounted upon tapered rollers 5. The pulley supporting device comprises two side frames 6 which have grooves 7 therein into which the flanges 4 extend. Figure 4 shows how the rollers 5 have their axes radially aligned with the center of the side frames 6. The rollers therefore permit the sides to rotate slightly.

The pulley 8 is mounted upon a shaft 9, the shaft in turn being rotatably secured to the side frames 6, by means of housings 10. The housings 10 are secured to the frames 6 by means of screws 13. The frames 6 are prevented from moving toward each other by means of collars 14, which may be shrunk upon the shaft 9.

The belt centering device comprises a frame which has side arms 15 that are secured to the projections 11 by means of pins 16. The arms 15 are rigidly connected to each other by means of struts 17. Bolts 12 removably secure the struts to the arms. The free ends of the arms carry auxiliary guide rollers 18. The guide rollers are rotatably mounted on the arms 15 and are provided with flanges 19 at their outer ends. As shown in Figure 1, the rollers 18 are tilted so as to raise the edges of the belt to increase its carrying capacity. When the belt 10 is moved sideways, it will move toward one of the flanges 19.

The arms 15 are supported in the position shown in Figure 2 by means of supporting arms 20. The arms 20 are secured to the arms 15 at 21 and are secured at their other ends to the frames 6 by pins 22. The pins 22 are removably carried by the frame 6 so as to permit the arms 20 to be disconnected temporarily from the frames. I have shown the belt centering device as being disposed on the right hand side of the pulley 8 in Figure 1. As stated in one of the objects of the application, the device may be swung over onto the opposite side of the pulley 8. The arms 15 and 20 may be detached and replaced on opposite sides facing in opposite directions when it is desired to change the guide from one side to the other.

From the foregoing description of the various parts of the device, the operation thereof may be readily understood. Assume that the belt should move in the direction of the arrow shown in Figure 1, so as to cause the edge of the belt to engage with the flange 19 of the roller 18. If the belt should continue to move in this direction, it would cause the roller 18 to swing the entire belt guide a slight distance in the direction of the arrow. The rollers 5 permit this movement. It will be noted that the frames 6 tend to rotate slightly upon the flanges 4. This rotative movement is very slight, however, and is just sufficient to take up any extra movement of the belt in a lateral direction. Normally the rollers 18 extend at right angles to the belt and the belt is kept positioned midway between the rollers. When the rollers have been moved in the direction of the arrow, their axes will extend at an angle to the center line of the belt. The belt bearing on the surface of the lower roller 18 in Figure 1 will be carried in the opposite direction of that shown by the arrow. This movement is due solely to the inclination of the axis of the roller. The other roller 18 will also aid in this movement. As soon as the belt has been moved back into place, the edge thereof will strike the flange of the upper roller 18 in Figure 1 and will swing the belt guide back into normal position. In practice the flanges 19 are disposed close to the edges of the belt so as to have the device function as soon as the belt moves laterally.

In Figures 4 and 5 I have shown a modified form of the device. In this form of the device, the pulley supporting member 30 is mounted upon friction rollers or balls 31 and is pivoted to the supporting surface 32 by means of a bolt or the like 33. The frame 30 is adapted to be rotated slightly about the pivot 33 in the same manner as the frames 6 are rotated. The frame 30 is made from a single piece, and has its ends struck up so as to provide bearings for the pulley shaft 34. The belt guide rollers 35 are shaped differently from the rollers 18. In this form of the device the rollers are mounted upon a vertical axis and have two conical-shaped portions 36 and 37 which merge together so as to provide a V-shaped groove 38. The conical-shaped portion 36 is larger in area than the portion 37. An arm 39, similar to the arm 15, supports the roller 35. A second arm 40 similar to the arm 20, supports the arm 39. The arm 39 is pivoted to a projection 43 by means of a pin 41. The arm 40 is hinged to the support 30 at 42. The rollers 35 may be swung from one side of the pulley 43 to the other side, the hinged arms 39 and 40 permitting this movement. Struts 44 are removably secured to the arms 39 and are first removed to permit the arms to be swung, and then are secured in place.

The operation of this device is very similar to the preferred form of the device. The member 30 and its attached parts rotate on the rollers or balls 31 about a center.

I claim:

1. A belt guide comprising separated stationary frames, said stationary frames having inwardly extending flanges, a pulley-carrying frame having grooves for receiving said flanges, bearings operatively connecting said pulley-carrying frame with said flanges for permitting the oscillation of the pulley-carrying frame about a common center with respect to the stationary frames, a belt-supporting pulley carried by said pulley-carrying frame, inclined guide rollers for engaging with the belt in advance of said belt-supporting pulley for forming a trough in the belt, and braces connecting said inclined rollers to said pulley-carrying frame, said braces permitting the inclined rollers to be swung on either side of said belt-carrying pulley.

2. An automatic belt guide comprising a support having wedge-shaped flanges, a pulley-carrying member having a guide groove arranged to receive said flanges, tapered rollers disposed within the groove in contact with said flanges for supporting said pulley-carrying member to oscillate about a center, a belt-supporting pulley carried by said pulley-carrying member, brace members carried by said pulley-carrying member, inclined rollers carried by said brace members for supporting and guiding said belt, and flanges carried by said guide rollers at their outer extremities for engaging the edges of the belt.

BARTON ROSS.